US012579253B2

(12) United States Patent
Kussmaul et al.

(10) Patent No.: US 12,579,253 B2
(45) Date of Patent: Mar. 17, 2026

(54) CONTROLLING WORKLOAD EXECUTION ON TRUSTED EXECUTION ENVIRONMENTS

(71) Applicant: International Business Machines Corporation, Armonk, NY (US)

(72) Inventors: Timo Kussmaul, Boeblingen (DE); Muhammad Usman Karim Khan, Sindelfingen (DE); Stefan Liesche, Boeblingen (DE); Marco Pavone, Ehningen (DE); Ephraim Petry, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 18/779,726

(22) Filed: Jul. 22, 2024

(65) Prior Publication Data

US 2025/0348575 A1     Nov. 13, 2025

(30) Foreign Application Priority Data

May 8, 2024     (GB) ..................................... 2406371

(51) Int. Cl.
*G06F 21/53* (2013.01)
(52) U.S. Cl.
CPC ........ *G06F 21/53* (2013.01); *G06F 2221/033* (2013.01)
(58) Field of Classification Search
CPC ........................... G06F 21/53; G06F 2221/033
See application file for complete search history.

(56) References Cited

U.S. PATENT DOCUMENTS

| | | | |
|---|---|---|---|
| 11,295,014 B2 | 4/2022 | Cheng et al. | |
| 11,782,772 B1 | 10/2023 | Agrawal et al. | |

(Continued)

FOREIGN PATENT DOCUMENTS

| | | | | |
|---|---|---|---|---|
| CN | 113569263 A | 10/2021 | | |
| CN | 111049825 B | 11/2021 | | |
| WO | WO-2022050930 A1 * | 3/2022 | ............. | G06F 9/468 |

OTHER PUBLICATIONS

"About the contract", IBM Cloud docs, retrieved from web dated Jul. 19, 2024, 37 pages, https://cloud.ibm.com/docs/vpc?topic=vpc-about-contract_se.

(Continued)

*Primary Examiner* — Beemnet W Dada
(74) *Attorney, Agent, or Firm* — Kelsey M. Skodje

(57) ABSTRACT

A method, system, and computer program product receive constraints for execution of a workload on one or more trusted execution environments from a plurality of entities. The constraints form a constraint space. An execution requirement for controlling the trusted execution environment(s) using the constraints is automatically generated. The execution requirement defines parameters for executing the workload in compliance with the constraints. The automatically generating includes adding identifiers of the constraints to the execution requirement for an attestation of constraints being complied with by the trusted execution environment(s) when executing the workload in compliance with the execution requirement. The trusted execution environment(s) are controlled in compliance with the execution requirement. The controlling includes providing the execution requirement to the trusted execution environment(s), which enables the trusted execution environment(s) to provide one or more attestation records for an attestation of the execution. The attestation records include the identifiers.

20 Claims, 8 Drawing Sheets

(56) References Cited

U.S. PATENT DOCUMENTS

2016/0350534 A1    12/2016  Poornachandran et al.
2017/0364345 A1*   12/2017  Fontoura ................... G06F 9/52
2022/0108026 A1     4/2022  Ortiz et al.

OTHER PUBLICATIONS

"Azure Instance Metadata Service", https://learn.microsoft.com/en-us/azure/virtual-machines/instancemetadata-service, Nov. 2, 2023, 48 pages.
"The Second Generation of IBM Hyper Protect Platform", IBM, 40 pages, https://www.ibm.com/downloads/cas/GPVMWPM.
"Work with instance metadata", Amazon EC2, retrieved on Jul. 19, 2024, 3 pages. https://docs.aws.amazon.com/AWSEC2/latest/UserGuide/ec2-instance-metadata.html.
Intellectual Property Office, "Patents Act 1977: Search Report under Section 17(5)", Oct. 29, 2024, 3 Pages, GB Application No. 2406371.1.
Vukasovic et al. "Programming Applications Suitable for Secure Multiparty Computation Based on Trusted Execution Environments", Conference: 2022 30th Telecommunications Forum (TELFOR), Nov. 2022, 1 page.
Wu et al., "Hybrid Trust Multi-party Computation with Trusted Execution Environment," Network and Distributed Systems Security (NDSS) Symposium, Apr. 2022, pp. 1-18.
International Searching Authority, "Notification of Transmittal of the International Search Report and the Written Opinion of the International Searching Authority, or Declaration," Patent Cooperation Treaty Jun. 2, 2025, 14 pages, International Application No. —PCT/EP2025/061604.

* cited by examiner

400

Monitor constraint space — 401

Receive adjustment — 402

404

NO

Conflict between constraints detected?

YES

Flag detected conflict — 406

Resolve detected conflict — 408

Generate adjusted execution requirement for
controlling trusted execution environment — 410

Control trusted execution environment
in compliance with the adjusted execution requirement — 412

500

520

522

514

516

524

510

505

503

600

800

CONTROLLING WORKLOAD EXECUTION ON TRUSTED EXECUTION ENVIRONMENTS

BACKGROUND

The present disclosure relates to the field of digital computer systems, and more specifically, to controlling an execution of a workload on one or more trusted execution environments.

Workloads and sensitive data often must be protected throughout their lifecycle. Sensitive data may need to be protected when being stored, transmitted, and/or processed. Confidential computing can be used to protect sensitive data, e.g., when using cloud computing technology, by isolating the sensitive data in a protected central processing unit (CPU) enclave, also referred to as a trusted execution environment, during processing. Confidential computing can also restrict access to content of the trusted execution environment, such as data being processed and/or techniques being used to process the data.

SUMMARY

Various embodiments are directed to a method that includes receiving constraints for execution of a workload on one or more trusted execution environments from a plurality of entities, the constraints forming a constraint space. The method also includes automatically generating an execution requirement for controlling the one or more trusted execution environments using the constraints of the constraint space. The execution requirement defines parameters for execution of the workload in compliance with the constraints. The automatically generating comprises adding identifiers of the constraints to the execution requirement for an attestation of constraints being complied with by the one or more trusted execution environments when executing the workload in compliance with the execution requirement. The method further includes controlling the one or more trusted execution environments in compliance with the execution requirement. The controlling includes providing the execution requirement to the one or more trusted execution environments. The providing enables the one or more trusted execution environments to provide one or more attestation records for an attestation of the execution of the workload. The attestation records include the identifiers of the constraints.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
FIG. 1 is a flowchart illustrating a method for controlling an execution of a workload on one or more trusted execution environments, according to some embodiments.
Figure 1:
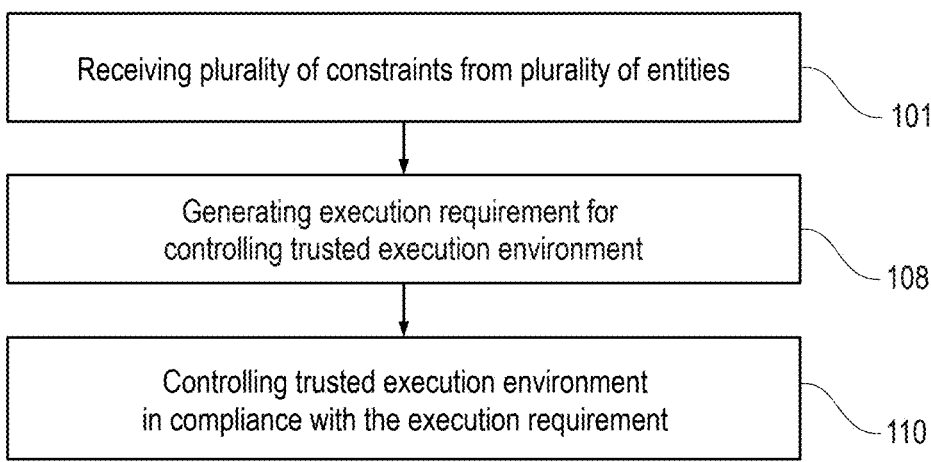

While the invention is amenable to various modifications and alternative forms, specifics thereof have been shown by way of example in the drawings, and will be described in detail. It should be understood, however, that the intention is not to limit the invention to the particular embodiments described. Instead, the intention is to cover all modifications, equivalents, and alternatives falling within the spirit and scope of the invention.

DETAILED DESCRIPTION

Aspects of the present disclosure relate generally to digital computer systems and, more specifically, to controlling an execution of a workload on one or more trusted execution environments.

Various embodiments of the present disclosure are described herein with reference to the related drawings, where like numbers refer to the same component. Alternative embodiments can be devised without departing from the scope of the present disclosure. The following definitions and abbreviations are to be used for the interpretation of the claims and the specification. As used herein, the terms "comprises," "comprising," "includes," "including," "has," "having," "contains," "containing," or other variation thereof, are intended to cover a non-exclusive inclusion. As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular. As used herein, the terms "invention" or "present invention" are non-limiting terms and not intended to refer to any single aspect of the particular invention but encompass all possible aspects as described in the specification and the claims.

Protection of workloads and sensitive data throughout their lifecycles is a concern across many industries and organizations. Sensitive data may not only need to be protected when being stored or transmitted, but also when being processed. To protect sensitive data during processing, confidential computing can be used. For example, confidential computing may be used when processing data using cloud computing technology. Confidential computing technology can isolate the sensitive data in a trusted execution environment (e.g., a protected central processing unit (CPU) enclave) during processing. Access to content of the trusted execution environment, such as data being processed and/or techniques being used to process the data, can be restricted. However, confidential computing can become challenging when multiple entities are involved. Existing approaches such as simply running processes defined by multiple entities taking part in the confidential computing may cause serious security risks. Thus, there is a need for an improved approach in confidential computing with multiple entities.

Embodiments of the present disclosure may overcome these and other challenges by executing a confidential computing control service. The confidential computing control service can receive constraints for the execution of a workload from more than one entity (e.g., three or more entities). The confidential computing control service may use the received constraints to generate an execution requirement for controlling one or more trusted execution environments. Executing the workload in compliance with the execution requirement may ensure execution in compliance with the constraints required by all of the entities. Added identifiers of the constraints can enable an attestation of the constraints that each trusted execution environment respectively complies with when the workload is executed in compliance with the execution requirement. Thus, execution in compliance with the constraints by the plurality of entities can be implemented in a verifiable manner.

In some embodiments, the confidential computing control service may enable a secure, collaborative control of confidential computing workloads. Further, the confidential computing control service may enable multiple entities to have control over an execution of a workload on one or more trusted execution environments. The control may include, e.g., selection of integrable components used for the execution of the workload.

The confidential computing control service may avoid disadvantages in confidential computing environments associated with existing solutions, such as simply running what is defined by multiple entities. This may prevent security risks in confidential computing, such as components being compromised and/or data being leaked by a malicious component.

The confidential computing control service may also enable entities to delegate subsets of a workload specification to other entities. This can provide a flexible and cryptographically secured mechanism to specify workload and environment properties for an execution of a workload on one or more trusted execution environments. The entities may include, e.g., one or more workload providers.

In some embodiments, the confidential computing control service utilizes constraints provided by the entities for controlling workload specification in an execution requirement. The execution requirement may enable a highly distributed multiparty definition of the workload execution.

The confidential computing control service may take into account all of the constraints defined by a set of entities and enforce constraints defined by the entities as non-circumventable by other entities, including other entities from the set of entities. If conflicts between constraints received from different entities in set are detected, these conflicts may be resolved by involving the entities defining the conflicting constraints. This can ensure that any adjustments applied to the constraints in order to resolve a conflict between constraints are approved by the entities that have defined the constraints. This can prevent deviation or circumvention of constraints defined by an entity for the execution of the workload without the entity's consent.

The generated execution requirement may ensure completeness and consistency against all constraints received from the entities. An implementation of the constraints may, e.g., utilize a policy language.

Rather than trying to avoid conflicts between constraints using initially applied limitations to the execution requirement, the confidential computing control service may allow a non-limited number of entities to contribute constraints (e.g., expressive and/or flexible constraints) for the execution requirement. The confidential computing control service may automatically generate the execution requirement with the constraints contributed by the entities while also enabling a handling and/or resolution of potential conflicts between these constraints, if any such conflicts are detected.

The confidential computing control service may automatically control a set of trusted execution environments. Constraints for execution of a workload on the trusted execution environments can be received from a plurality of entities. The constraints may form a constraint space defining constraints for the execution of the workload. The constraints may include, e.g., constraints on properties of applications used for executing the workload, constraints on properties of execution environments used for executing the workload, constraints on constraints, etc. In some embodiments, the constraint space is kept conflict-free. If a conflict between constraints of the constraint space is detected, the detected conflict may be resolved.

In some embodiments, an execution requirement for controlling the trusted execution environment can be generated using the received constraints forming the constraint space. The generated execution requirement may ensure that all the constraints of the constraint space are satisfied.

For each of the constraints of the constraint space, an identifier may be determined and assigned to the corresponding constraint. The identifiers of the constraints may be added to the execution requirement for an attestation of the constraints. The identifiers may be configured to uniquely identify the individual constraints of the execution requirement and the contents of each constraint. The identifiers may, for example, be fingerprints, such as checksums, of the constraints. In some embodiments, the checksums can be implemented in the form of hash values. Such a checksum may result from applying a one-way checksum function, e.g., a hash function, to the constraint.

At least one secret may be received or generated. For example, at least one secret per entity and/or constraint can be received or generated by the confidential computing control service. The secrets can be added to the execution requirement. In some embodiments, received or generated secrets may be used for encrypting data of the execution of the workload on the trusted execution environment(s). For example, secrets may be used for encrypting data resulting from the execution of the workload on the trusted execution environments. In order to gain access to the encrypted data, it may be necessary to decrypt the data. In some embodiments, the secrets may be used for decrypting the encrypted data. For example, the secrets may be used for enabling encrypted communication between the trusted execution environments and the entities.

In some embodiments, the trusted execution environments may encrypt and decrypt data in the trusted execution environments using the one or more secrets. In some embodiments, the generated execution requirement includes secrets that can be used in combination for encrypting and decrypting data of the execution of the workload on the execution environments. For example, the secrets may be combined to derive a symmetric cryptographic key for encrypting and decrypting the data.

An execution of the workload on the trusted execution environments may be controlled according to an execution requirement by using the constraints included in and/or defined by the execution requirement.

In some embodiments, the trusted execution environments can provide attestation records of the respective constraints used to control the trusted execution environments. These attestation records may include identifiers of the respective constraints. The identifiers from the attestation records may be used to determine whether the trusted execution environments are indeed controlled using the constraints from the execution requirement.

Providing the attestation records can allow the entities to independently verify whether the trusted execution environments execute the workload in accordance with the entities' constraints. Each entity may be enabled to check whether the trusted execution environments are indeed controlled using the constraints provided by that entity. For example, an entity may determine whether an attestation record includes identifiers of the constraints provided by the entity.

An execution requirement may define, in a machine-readable way, constraints to be satisfied by a trusted execution environment used for confidential computing when executing a workload. These constraints from the execution requirement may, for example, define properties of one or more applications that are to be executed using a trusted execution environment. The constraints may also define properties of the applications' environments. In addition, the execution requirement may define one or more secrets to be used for securing the data processed by the trusted execution environment.

The trusted execution environment may execute the application(s) according to the properties specified by the constraints in the execution requirement. The trusted execution environment may also make the secrets available to each application for securing the data being processed by that application on the trusted execution environment.

The confidential computing control service may take into account multiple constraints provided by multiple entities for generating the execution requirement used for controlling the execution of the workload. In some embodiments, the confidential computing control service provides a process for automatically bringing together the constraints received from different entities to control provisioned or ready-to-be-provisioned applications on one or more trusted execution environments.

The confidential computing control service may detect conflicts between received constraints and provide means for resolving these conflicts. For example, the confidential computing control service can provide an approach for automatically ensuring that an execution requirement is consistent prior to a deployment using one or more trusted execution environments. The confidential computing control service may provide a way to verify and thus ensure consistency of the constraints of an execution requirement without requiring that potential conflicts be initially minimized by restricting constraints definable by the entities.

The confidential computing control service may provide a lifecycle control for an execution requirement. The constraint space used for generating the execution requirement may be monitored, and the confidential computing control service may update the execution requirement in response to an update to the monitored constraint space. In some embodiments, the execution requirement may be amended or revoked in response to an adjustment and/or revocation of constraints provided by at least one of the entities.

For example, application instances that are provisioned based on a generated execution requirement may be automatically deprovisioned or controlled using an updated execution requirement in response to an entity's requirements as described by the respective entity's constraints being amended.

Examples herein may be based on one or more of the following assumptions: A constraint provided by an entity may define one or more requirements for one or more allowed properties of one or more applications that are to be executed in one or more trusted execution environments and/or properties of the applications' environments. A constraint may include one or more secrets to be passed to the one or more applications. Constraints may be received from multiple different entities. A constraint may be related to one or more other constraints. For example, such a constraint may define syntactical or semantical requirements for another constraint. A constraint may be expressed using a constraint language.

The trusted execution environments may be hardware-based trusted execution environments. A hardware-based trusted execution environment can be an execution environment that can provide hardware-based technical assurance of properties that may include data confidentiality, data integrity, code confidentiality, code integrity, programmability, and attestation. Data confidentiality can prevent unauthorized entities from viewing data while the data is in use within the trusted execution environment. Data integrity can prevent unauthorized entities from adding, removing, or altering data while the data is in use within the trusted execution environment. Code integrity can prevent unauthorized actors from adding, removing, or altering code that is running in the trusted execution environment.

Code confidentiality can ensure that the trusted execution environment protects the code from being viewed or accessed by unauthorized entities while in use. Programmability can ensure that the trusted execution environment can be programmed with arbitrary code. Attestation refers to a process with which the trusted execution environment can provide evidence or measurements (e.g., identifiers) of its origin and current state. This evidence can be verifiable by other entities, which can be enabled by the evidence provided to decide whether or not to trust an application running in the trusted execution environment. The evidence may be provided in the form of an attestation record. The contents of the attestation record may be verified against workload and/or environment expectations. The attestation record may be signed using a cryptographical key, which may be anchored in hardware that may, e.g., be vouched for by a trusted manufacturer. This signature can provide assurance that the attestation record was generated by the correct component and was not altered by an unauthorized entity.

Due to the code and data confidentiality and integrity implemented by the trusted execution environment, the trusted execution environment may isolate application code and data provided to the trusted execution environment as workload from access and modification by unauthorized entities. The application code and data can be isolated from access and modification by other privileged as well as non-privileged entities (e.g., potentially malicious administrators, as well as other tenants).

Confidential computing refers to protection of data that is in use by performing computation in a hardware-based, attested trusted execution environment. Confidential computing may provide a trusted execution environment for applications, even in an untrusted environment. The hardware-based security mechanism that is offered by confidential computing can enable processing and storing of sensitive data in a safe enclave provided by one or more trusted execution environments isolated from the host system and other potentially vulnerable components.

The execution requirement, sometimes referred to as a contract, can be a document that includes constraints for an execution of a workload on one or more trusted execution environments. The execution requirement may define parameters for the execution of the workload in compliance with the constraints. For example, the execution environment may define properties of one or more applications to be executed in the trusted execution environments and properties of one or more environments in which the applications are to be executed. The execution requirement may be a document that includes more than one section. Each of the sections may be assigned to one of the entities and/or include the constraints received from the entity. In some embodiments, the different sections may be encrypted independently.

In some embodiments, an execution requirement may include an application parameter defining an application workload to be executed on a trusted workload, as well as an environment parameter describing the environment in which the application workload is to be executed. For example, the application parameter may define one or more virtual machines, also referred to as images, on which the application is to be executed, a virtual machine registry where it resides, and/or the information and credentials that are required to download and validate the virtual machine. An environment parameter may describe an environment for the application. Environment parameters may define information about logging, such as where logs should be sent to. The execution requirement may further include information about data volumes, seeds for deriving a volume encryption passphrase, and/or a public part of an execution requirement signing key. The execution requirement may comprise a cryptographic key, e.g., a public cryptographic key to be used to encrypt an attestation record.

An attestation record can include identifiers, such as checksums, of constraints complied with by the one or more trusted execution environments executing the workload. The attestation record may further include identifiers, such as checksums, of an original base virtual machine used to execute the workload, a compressed root filesystem, and/or cloud initialization options. The attestation record may be signed. A signature verification key configured for verifying the signature of the attestation record may be provided. The attestation record may be encrypted in some embodiments.

Identifiers, such as checksums, of the data elements of the attestation record may be compared against identifiers of an expected execution requirement. If this validation succeeds, because the identifiers being compared are identical, this may prove that the trusted execution environment uses the expected execution requirement for the execution of the workload. This means that the trusted execution environment may run the expected environment and virtual machines that are defined in the execution requirement.

Data of the execution of the workload on the trusted execution environment may be encrypted using a passphrase derived using secrets, such as cryptographic seeds provided by and/or assigned to different entities of the plurality of entities. This can mean that no entity of the plurality entities can individually recreate the passphrase because each of the entities may only know its own cryptographic seed.

For implementing a secure handling of cryptographic keys, one or more hardware security modules (HSMs) may be used. An HSM is a device or service that safeguards and manages secrets, such as cryptographic keys, and performs cryptographic functions such as key creation, key derivation, encryption, decryption, and a signature. An HSM may contain one or more cryptographic processors. A cloud HSM is a cloud service that provides the same functions as a physical HSM.

In some embodiments, the identifiers of the constraints of the constraint space can be determined.

For example, the identifiers can be checksums of the constraints. The determining of the identifiers can include calculating the checksums of the respective constraints of the constraint space. For example, a checksum can be calculated for each of the constraints of the constraint space.

The checksums may enable checking which constraints are taken into account and/or included in the execution environment. The checksums may, e.g., be calculated using a one-way function. The checksums may, e.g., be hash values calculated using a hash function.

In some embodiments, the constraints of the constraint space can define the parameters for the execution of the workload on the one or more trusted execution environments. These parameters may define the workload (e.g., an application to be executed on one or more of the trusted execution environments). The parameters may, e.g., define a version of the application and/or setup parameters of the application. The parameters may, e.g., define features of an environment within which the application is to be executed. The features may include, e.g., certificates, cryptographic algorithms, authentication parameter, communication parameter, application programming interface (API)-keys, initialization data, resources, quota on filesystems, filesystem size, message busses, etc., to be provided by the environment for the execution of the workload.

In some embodiments, the constraints of the constraint space include one or more first constraints and one or more second constraints. The one or more first constraints can include one or more additional constraints on one or more of the parameters defined by the one or more second constraints for the execution of the workload. Thus, the constraints may also include constraints on other constraints.

In some embodiments, the method further includes checking the constraints of the constraint space for conflicts between the constraints. In response to detecting one or more conflicts, the detected conflicts can be flagged. By checking the constraint space for conflicts, it may be determined whether the constraint space is free of conflicts between constraints (conflict-free). When the constraint space is conflict-free, no further conflict related actions may be required. When a conflict is detected, the conflict may need to be dealt with. Dealing with the conflict may include flagging the conflict and may also include resolving the flagged conflict. By resolving all of the conflicts, a conflict-free constraint space may be provided as a basis for generating the execution requirement.

Using a conflict-free constraint space for generating the execution requirement may ensure that all the constraints defined by the different entities are complied with when the workload is executed according to the execution requirement.

In some embodiments, resolving a detected conflict of the constraint space includes generating a priority list of conflicting constraints of the constraint space. The conflicting constraints can be constraints between which the conflict is detected. The priority list can assign priorities to each of the conflicting constraints. A proposal for resolving the detected conflict can be generated using a constraint assigned with a highest priority on the priority list. The proposal can be sent to one or more entities assigned to a constraint with a lowest priority on the priority list. In response to receiving approvals of the proposal from each entity assigned to the constraint with the lowest priority, the proposal can be sent to one or more entities assigned to a constraint with a next higher priority. The sending of the proposal can be continued for entities assigned to constraints in order of priority until approvals of the proposal are received from all entities assigned to the constraint with a second highest priority on the priority list. In response to receiving approvals of the proposal from all entities assigned to the constraint with the second highest priority, the detected conflict can be resolved using the proposal.

Using a constraint with a highest priority for resolving the detected conflict, the entities assigned to this constraint with the highest priority are assigned to the proposal, meaning that these entities have requested this constraint and thus approved of it. Therefore, as soon as approvals of the proposal from all entities assigned to the constraint with the second highest priority have been received, approvals for using the proposal for resolving the conflict have been provided by all the entities involved in the conflict.

In some embodiments, all of the detected conflicts may be resolved according to the aforementioned method, resulting in a conflict-free constraint space.

In some embodiments, the priorities assigned to each of the constraints by the priority list are determined using one or more of the following: levels of security determined for the constraints, levels of restriction determined for the constraints, numbers of entities assigned to the constraints. The higher the level of security of a constraint, the higher the constraint's priority may be. For example, in view of security of an application, the newer a version of an application is, the higher its level of security may be. The higher a level of restriction of a constraint, the higher the constraint's priority may be. The more restrictive an execution of an application is, the more difficult it may be to successfully attack and compromise the execution of this application. The higher a number of entities that are assigned to a constraint is, the higher the constraint's priority may be. The more entities requiring a constraint, the more important the constraint may be. Taking into account the number of entities assigned to a constraint, determining a proposal to resolve a conflict may implement a kind of consensus model.

In some embodiments, the priority list of the constraints includes at least two constraints received from two different entities. For example, the priority list of the constraints can include a plurality of constraints, e.g., two or more constraints received from two or more different entities.

In some embodiments, the priority list can sort the constraints between which a conflict is detected according to the assigned priorities.

In some embodiments, the sending of the proposal to more than one entity assigned to a constraint includes generating a priority list of the entities. The priority list may assign priorities to each of the entities. In some embodiments, such a priority list of the entities may be used for resolving conflicts. For example, a constraint received from the entity with the highest priority may be used as a proposal for resolving a conflict. In some embodiments, the proposal is sent an entity assigned with a lowest priority. In response to receiving an approval of the proposal from the entity with the lowest priority, the proposal can be sent to an entity with a next higher priority. The sending of the proposal can be continued with each entity on this list until an approval of the proposal is received from an entity assigned with a second highest priority.

In some embodiments, the priority assigned to each entity can be determined using one or more of the following: levels of security determined for constraints received from the entity, levels of restriction determined for constraints received from the entity, numbers of constraints assigned to the entity. The higher the levels of security determined for constraints received from an entity, the higher the entity's priority may be. The higher the levels of restriction determined for constraints received from an entity, the higher the entity's priority may be. The higher a number of constraints assigned to an entity, the higher the entity's priority may be.

In some embodiments, the method further includes monitoring the constraint space. When monitoring the constraint space, adjustments of the constraint space may be detected, and suitable measures may be taken based on the detected adjustments. Monitoring the constraint space may include maintaining the constraint space to keep it conflict-free. For example, when an adjustment of the constraint space resulting in a conflict is detected, the respective conflict may be resolved in order to keep the constraint space conflict-free.

In some embodiments, the method includes receiving one or more adjustments of the constraint space from one or more of the entities. The adjustments of the constraint space may include, e.g., one or more additional constraints to be added to the constraint space, one or more constraints being removed from the constraint space, and/or one or more updated (adjusted) constraints replacing one or more constraints of the constraint space.

In some embodiments, the monitoring of the constraint space includes checking the constraints of the adjusted constraint space for conflicts between them resulting from the received adjustments. In response to detecting one or more conflicts, the detected conflicts can be flagged.

In some embodiments, the method further includes sending information about the flagged conflicts of the adjusted constraint space to the one or more trusted execution environments controlled in compliance with the execution requirement. The information can indicate that execution of the workload should be aborted. For example, the one or more trusted execution environments may abort execution of the workload in response to receiving the information about the flagged conflicts.

In some embodiments, the method includes resolving the detected conflicts of the adjusted constraint space.

In some embodiments, resolving a detected conflict of the adjusted constraint space includes generating a priority list of constraints of the adjusted constraint space in which the conflict is detected. The priority list can assign priorities to each of the constraints. A proposal for resolving the detected conflict can be generated using a constraint with a highest priority. The proposal can be sent to one or more entities assigned to a constraint with a lowest priority. In response to receiving approvals of the proposal from all entities assigned to the constraint with the lowest priority, the proposal can be sent to one or more entities assigned to a constraint with a next higher priority. The sending of the proposal can be continued with entities assigned to the constraints in order of priority until approvals of the proposal are received from all entities assigned to the constraint with a second highest priority on the priority list. In response to receiving approvals of the proposal from all entities assigned to the constraint with the second highest priority, the detected conflict can be resolved using the proposal.

In some embodiments, the method further includes, in response to receiving the one or more adjustments, generating an adjusted execution requirement for controlling the one or more trusted execution environments using the constraints of the adjusted constraint space. The adjusted execution requirement can define adjusted parameters for the execution of the workload in compliance with the constraints of the adjusted constraint space. The generating can include adding identifiers of the constraints to the adjusted execution requirement for an attestation of the constraints that the one or more trusted execution environments comply with when executing the workload in compliance with the adjusted execution requirement. The one or more trusted execution environments can be controlled in compliance with the adjusted execution requirement. The controlling can include providing the one or more trusted execution environments with the adjusted execution requirement as a replacement for the execution requirement.

Thus, the workload may be executed on the one or more trusted execution environments in compliance with the adjusted execution requirement. Thereby, the adjustments of the constraint space may be taken into account for the execution of the workload.

In some embodiments, the adjustments include one or more of the following: a revocation of a constraint, an adjusted constraint, and an additional constraint.

The revocation of a constraint of the constraint space may result in a removal of the constraint from the constraint space. The adjustments of the constraint space may include, e.g., one or more constraints being removed from the constraint space.

The adjusted constraint may be used to replace a constraint of the constraint space. The adjustments of the constraint space may include, e.g., one or more updated, i.e., adjusted, constraints replacing one or more constraints of the constraint space.

The additional constraint may be added to the constraint space. The adjustments of the constraint space may include, e.g., one or more additional constraints to be added to the constraint space.

In some embodiments, generating the execution requirement further includes adding at least one secret to the execution requirement, wherein the secret is to be used for encrypting and decrypting data of the execution of the workload on the one or more trusted execution environments. In some embodiments, the secret is received. In further embodiments, the secret is generated and sent to the entities.

For example, a secret may comprise a certificate, a cryptographic key, and/or a cryptographic seed configured to be used for a key derivation.

In some embodiments, generating the execution requirement also includes adding at least one secret per entity to the execution requirement, wherein each secret is to be used in combination for encrypting and decrypting data of the execution of the workload on the one or more trusted execution environments.

For example, each of the secrets may be assigned to one or more of the entities. In some embodiments, the secrets are received from the entities. In some embodiments, the secrets are generated and sent to the entities to which they are assigned.

In some embodiments, the generating of the execution requirement also includes adding at least one secret per entity to the execution requirement, wherein each secret is assigned to the entity and configured to be used for encrypting and decrypting a communication with the entity.

In some embodiments, generating the execution requirement also includes adding one secret per constraint to the execution requirement, wherein the secrets are to be used in combination for encrypting and decrypting data of the execution of the workload on the one or more trusted execution environments.

The secrets may be combined and used together to derive a cryptographical key for the encrypting and decrypting data of the execution of the workload on the one or more trusted execution environments.

In some embodiments, the method further includes generating a report of the generating and deploying of the execution requirement. The report can be sent to the entities. For example, the report of the generating and deploying of the execution requirement can be sent to the entities in response to receiving the constraints for the execution of the workload from the entities.

In some embodiments, the execution requirement includes a verifiable reference (e.g., a signature) to the confidential computing control service generating the execution requirement.

In a first example scenario, which is provided for illustrative purposes, an execution requirement may be generated using constraints received from three different entities.

The three entities may include, e.g., a workload provider (WP1) as a first entity, a DevSecOps (Development, Security, and Operations) provider (DS1) as a second entity, and a workload deployer (WD1) as a third entity.

The constraints received from the first entity WP1 may include:

```
require:
  play:
    resources:
    - apiVersion: v1
      kind: Pod
      metadata:
        name: paynow
      spec:
        hostNetwork: true
        hostPID: true
        containers:
        - name: paynow
          image:
          ghcr.io/ibm-hyper-protect/paynow-website@sha256:ddba7
          ports:
          - containerPort: 8443
          volumeMounts:
          - mountPath: /var/hyperprotect/
            name: hyper
seed: AAA...999
```

The constraints received from the second entity DS1 may include:

```
require:
  play:
    resources:
    - apiVersion: v1
      kind: Pod
      metadata:
        name: sysdig-cspm
      spec:
        containers:
        - name: sysdig-cspm-agent
          image:
          us.icr.io/sysdig-for-hpvs/kspm-analyzer@sha256:21b47
          env:
```

-continued

```
                - name: ACCESS_KEY
                    value: xxxxxxxxxxxxxxxxx
                - name: API_ENDPOINT
                    value: us-east.security-compliance-secure.cloud.ibm.com
logging:
    logDNA:
        hostname: *.logging.cloud.ibm.com
```

The constraints received from the third entity WD1 may include:

```
        require:
            logging:
                logDNA:
                    ingestionKey: xxxxxxxxxxxxxxx
                    hostname: syslog-a.eu-gb.logging.cloud.ibm.com 7
            seed: BBB...888
```

The constraints received from the three different entities can be used for generating an execution requirement. Generating the execution requirement may include combining the received constraints into an intermediary representation of the form: WP1's constraints-DS1's constraints-WD1's constraints.

As all constraints can be resolved successfully without conflicts being detected, it may be determined that there is no conflict, and an execution requirement may be generated in a format suitable for the trusted execution environment. The generated execution requirement may have the form:

```
workload: |
    type: workload
    play:
        resources:
            - api Version: v1
              kind: Pod
              metadata:
                  name: paynow-sysdig-cspm
              spec:
                  hostNetwork: true
                  hostPID: true
                  containers:
                  - name: paynow
                    image:
                    ghcr.io/ibm-hyper-protect/paynow-website@sha256:ddba7
                    ports:
                    - containerPort: 8443
                    volumeMounts:
                    - mountPath: /var/hyperprotect/
                      name: hyper
                  - name: sysdig-cspm-agent
                    image:
                    us.icr.io/sysdig-for-hpvs/kspm-analyzer@sha256:21b47
                    env:
                    - name: ACCESS_KEY
                        value: xxxxxxxxxxxxxxxxx
                    - name: API_ENDPOINT
                        value: us-east.security-compliance-secure.cloud.ibm.com
                  volumes:
                  - name: hyper
                    hostPath:
                        path: /var/hyperprotect/
                        type: Directory
env: |
    type: env
    logging:
        logDNA:
            ingestionKey: xxxxxxxxxxxxxxxxx
hostname: syslog-a.eu-gb.logging.cloud.ibm.com
seed: AAA...999BBB...888
```

In a second example scenario, which is provided for illustrative purposes, in addition to the aforementioned constraints received from the three entities WP1, DS1, and WD1, further constraints may be received from a fourth entity. The fourth entity may, e.g., be a second DevSecOps provider (DS2). The execution requirement may be generated using the constraints received from the four different entities.

The constraints received from the fourth entity DS2 may, e.g., comprise:

```
        require:
            logging:
                logDNA:
                    hostname: syslog-a.us*.logging.cloud.ibm.com
```

In some embodiments, trying to resolve all the constraints received from the four entities may be carried out in the following order: WP1's constraints-DS1's constraints-WD1's constraints-DS2's constraints. When comparing DS2's constraints with WD1's constraints or with a temporary result from evaluating WP1's, DS1's and WD1's constraints, a conflict may be detected because WD1 requires "syslog-a.eu-gb" as a constraint for the "hostname", whereas DS2 requires "syslog-a.us*". In response to detecting the conflict, the detected conflict may be flagged. In addition, the generating of the execution requirement may be paused. The generating may, e.g., be paused until the conflict is resolved. In order to resolve the conflict an interaction and/or a negotiation between DS2 and WD1 may be initiated and/or moderated.

Subsequently, WD1 may update the previously provided constraints as follows:

```
        require:
            logging:
                logDNA:
                    ingestionKey: xxxxxxxxxxxxxxx
                    hostname: syslog-a.us-south.logging.cloud.ibm.com
            seed: BBB...888
```

The updated constraint "syslog-a.us-south" required by WD1 for the "hostname" complies with the constrain "syslog-a.us*" required by DS2. Thus, the flag for the conflict may be removed and the generating of the execution requirement may be resumed using the updated constraints received from DS2.

The resulting execution requirement may have the form:

```
workload: |
    type: workload
    play:
        resources:
            - api Version: v1
              kind: Pod
              metadata:
                  name: timotest-sysdig-cspm
              spec:
                  hostNetwork: true
                  hostPID: true
                  containers:
                  - name: paynow
                    image:
                    ghcr.io/ibm-hyper-protect/paynow-website@sha256:ddba7
                    ports:
                    - containerPort: 8443
                    volumeMounts:
                    - mountPath: /var/hyperprotect/
                      name: hyper
```

-continued

```
        - name: sysdig-cspm-agent
          image:
          us.icr.io/sysdig-for-hpvs/kspm-analyzer@sha256:21b47
          env:
          - name: ACCESS_KEY
            value: xxxxxxxxxxx
          - name: API_ENDPOINT
            value: us-east.security-compliance-secure.
            cloud.ibm.com
      volumes:
        - name: hyper
          hostPath:
            path: /var/hyperprotect/
            type: Directory
  env: |
    type: env
    logging:
      logDNA:
        ingestionKey: 79271030d533ca3157f0cf46178d9a66
        hostname: syslog-a.us-south.logging.cloud.ibm.com
  seed: AAA...999BBB...888
```

FIG. 1 is a flowchart illustrating a method 100 for controlling an execution of a workload on one or more trusted execution environments, according to some embodiments. In operation 102, a plurality of constraints for the execution of the workload can be received from a plurality of entities. The received constraints can form a constraint space. In operation 108, an execution requirement for controlling the one or more trusted execution environments can be generated using the constraints of the constraint space. The execution requirement can be automatically generated. The execution requirement can define parameters for the execution of the workload in compliance with the constraints. The generating can include adding, to the execution requirement, identifiers of the constraints for an attestation of the constraints with which the one or more trusted execution environments comply when the workload is executed in compliance with the execution requirement. In operation 110, the one or more trusted execution environments are controlled in compliance with the execution requirement. The controlling can include providing the one or more trusted execution environments with the execution requirement. This can enable the one or more trusted execution environments to provide one or more attestation records for the attestation of the execution of the workload. The attestation records can include the identifiers of the constraints.

Figure 2:
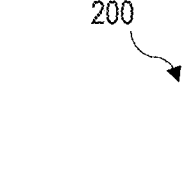
FIG. 2 is a flowchart illustrating a second method for controlling an execution of a workload on one or more trusted execution environments, according to some embodiments.
Figure 2:
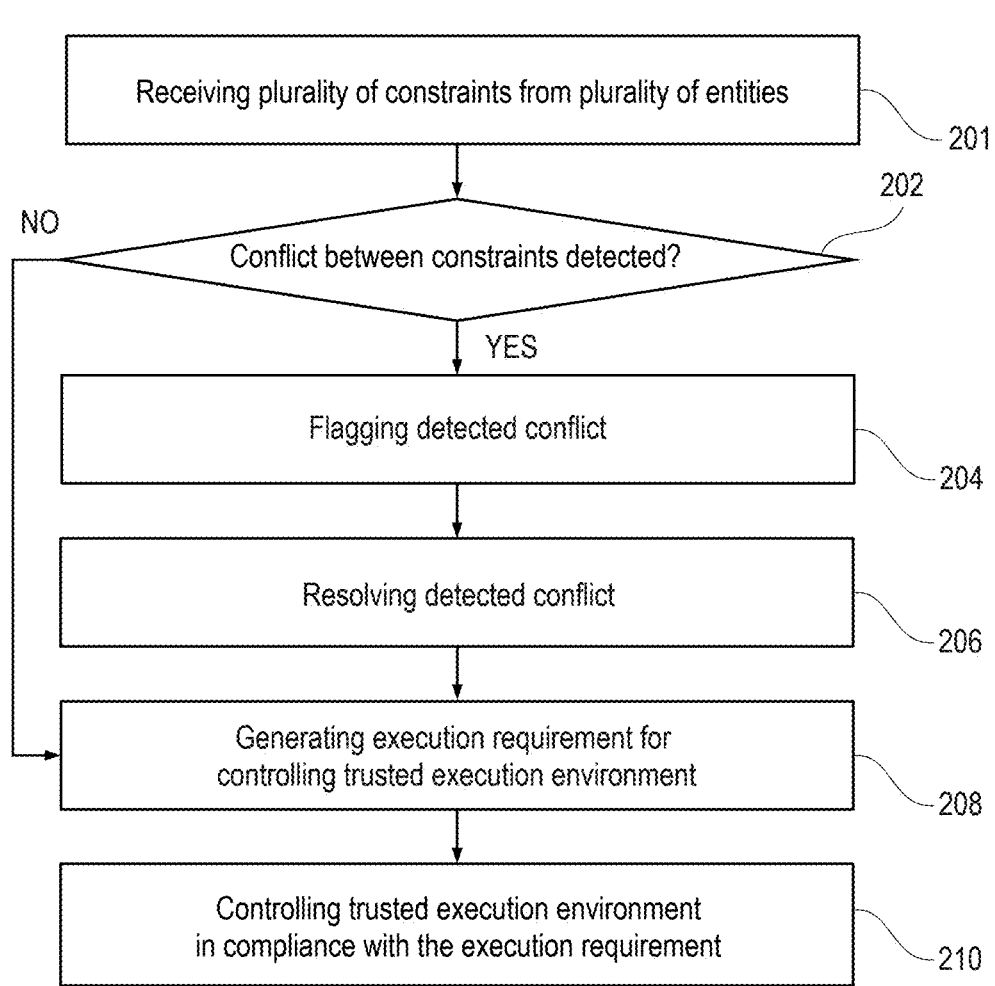

FIG. 2 is a flowchart illustrating a second method 200 for automatically controlling an execution of a workload on one or more trusted execution environments, according to some embodiments. In operation 201, a plurality of constraints for the execution of the workload can be received from a plurality of entities. The received constraints can form a constraint space. In operation 202, the constraints of the constraint space can be checked for conflicts between one another. In response to no conflicts being detected between the constraints of the constraint space, method 200 can proceed to operation 208 (see below). In response to one or more conflicts being detected between the constraints of the constraint space in operation 202, the one or more conflicts can be flagged in operation 204. The one or more conflicts flagged in operation 204 can be resolved in operation 206 (see, e.g., FIG. 3). In response to all the flagged conflicts having been resolved in operation 206, method 200 can proceed to operation 208. In operation 208, an execution requirement for controlling the one or more trusted execution environments can be automatically generated using the constraints of the constraint space. The execution requirement can define parameters for the execution of the workload in compliance with the constraints. The generating can include adding identifiers of the constraints to the execution requirement for an attestation of the constraints with which the one or more trusted execution environments comply when the workload is executed in compliance with the execution requirement. In operation 210, the one or more trusted execution environments can be controlled in compliance with the execution requirement. The controlling can include providing the one or more trusted execution environments with the execution requirement. This can enable the one or more trusted execution environments to provide one or more attestation records that include the identifiers of the constraints for attestation of the execution of the workload.

Figure 3:
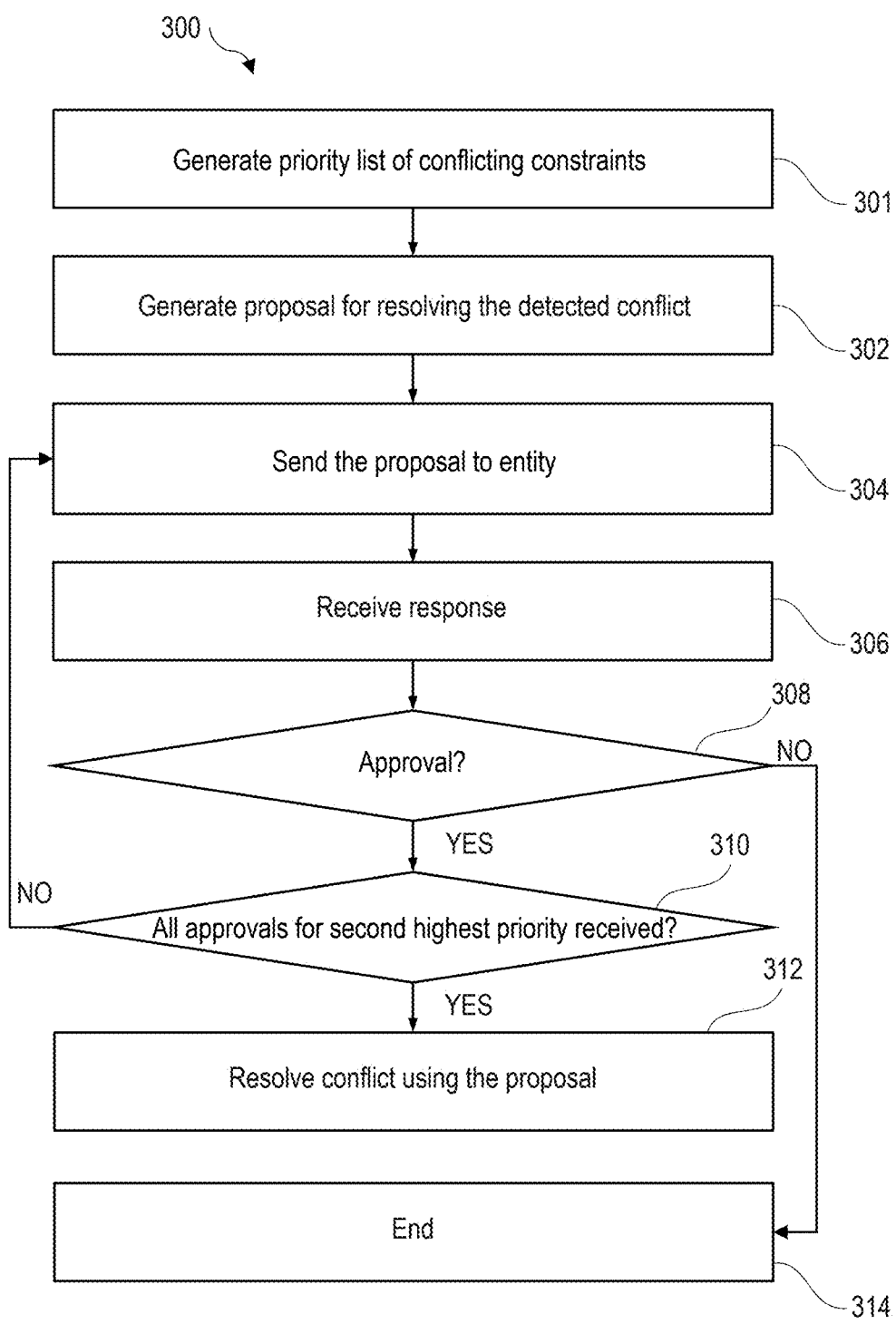
FIG. 3 is a flowchart illustrating a method for resolving conflicts between constraints, according to some embodiments.

FIG. 3 is a flowchart illustrating a method 300 for resolving conflicts between constraints, according to some embodiments. Method 300 may be used, e.g., in operation 206 of method 200 (FIG. 2), to resolve the one or more flagged conflicts. In operation 301, a priority list can be generated. The priority list can list conflicting constraints of a constraint space in which a conflict is detected. The priority list can assign priorities to the conflicting constraints. For example, the priorities assigned to the conflicting constraints by the priority list may be determined using one or more of the following: levels of security determined for the constraints, levels of restriction determined for the constraints, and numbers of entities assigned to the constraints. In operation 302, a proposal for resolving the detected conflict can be generated using a constraint assigned with a highest priority. In operation 304, the proposal can be sent to one or more entities, starting with each entity assigned to a constraint with a lowest priority on the priority list. In operation 306, one or more responses from the one or more entities can be received. In operation 308, it can be determined whether the received responses are approvals. In instances where one of the responses received in operation 306 is not an approval, method 300 can end. In instances where each of the responses received in operation 306 is an approval, method 300 can proceed to operation 310.

In operation 310, it can be determined whether approvals of the proposal have been received from all entities assigned to a constraint with a second highest priority according to the priority list. In instances where approvals of the proposal have not been received from all entities assigned to a constraint with a second highest priority according to the priority list, method 300 can return to operation 304 and send the proposal to one or more entities assigned to a constraint with a next higher priority. Operations 304-310 can be repeated until, in operation 310, it is determined that approvals of the proposal have been received from all entities assigned to the constraint with the second highest priority. In response to having receiving approvals of the proposal from all entities assigned to the constraint with the second highest priority, the proposal can be used to resolve the detected conflict in operation 312.

Figure 4:
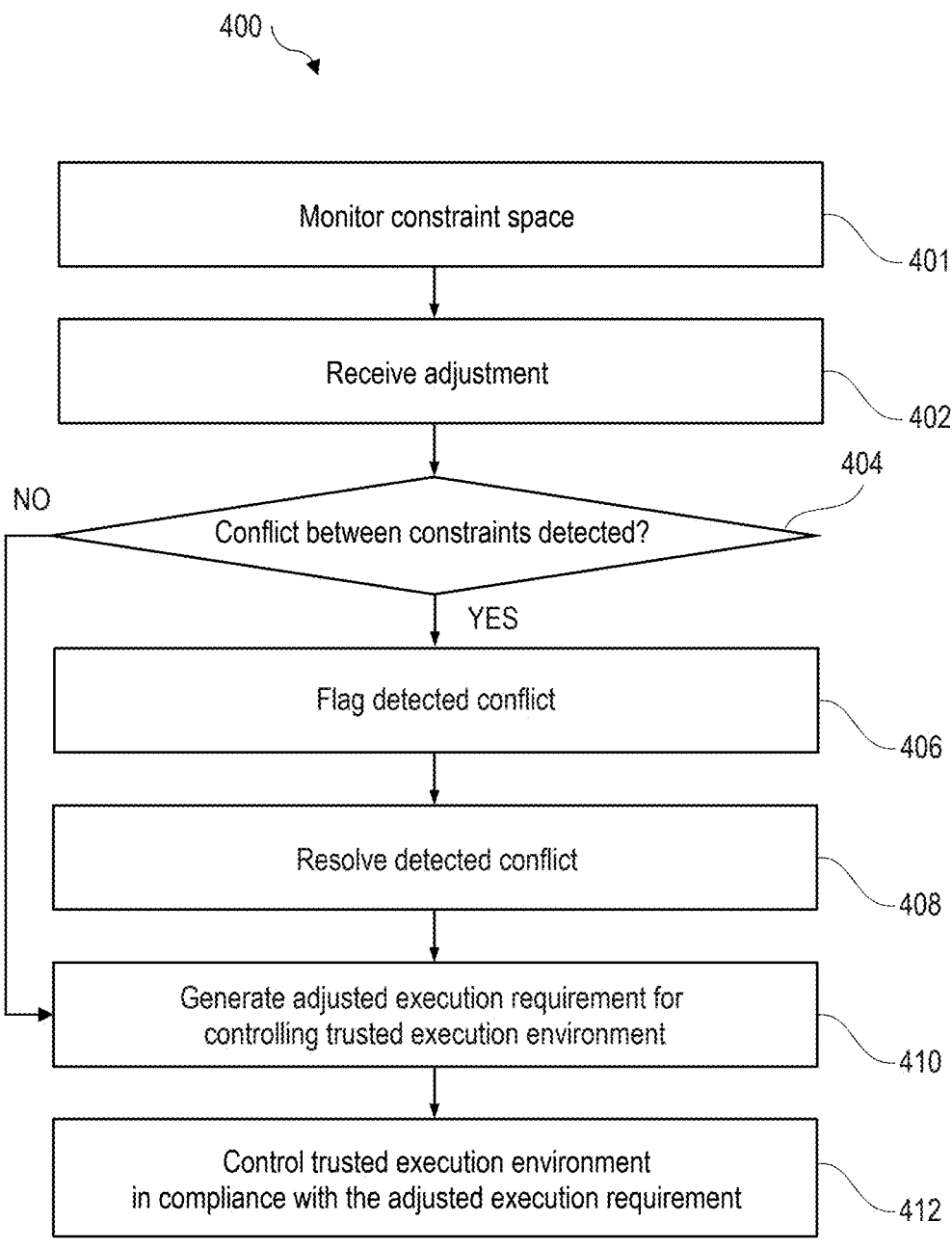
FIG. 4 is a flowchart illustrating a method for controlling an execution of a workload on a trusted execution environment, according to some embodiments.

FIG. 4 is a flowchart illustrating a method 400 for controlling an execution of a workload on a trusted execution environment, according to some embodiments. In operation 401, a constraint space can be monitored. The constraint space can be formed by a plurality of constraints for an execution of a workload received from a plurality of entities. In operation 402, one or more adjustments to the constraint space can be received from one or more of the entities. The one or more adjustments may include, e.g., a replacement of one or more of the constraints of the constraint space with one or more adjusted constraints, a deletion of one or more of the constraints of the constraint space, and/or an addition of one or more additional constraints to the constraint space. The constraint space can be adjusted using the one or more received adjustments.

In operation 404, the constraints of the adjusted constraint space can be checked for conflicts between one another resulting from the received adjustments. In response to no conflicts being detected, method 400 can proceed to operation 410 (see below). In response to detecting one or more conflicts, each detected conflict can be flagged in operation 406. In operation 408, the one or more flagged conflicts of the adjusted constraint space may be resolved. In some embodiments, method 300 (FIG. 3) may be used to resolve the flagged conflicts in operation 408. For example, method 300 may be used to generate a priority list of constraints between which a flagged conflict is detected. The priority list can assign priorities to each of these constraints. A proposal may be generated for resolving the detected conflict using a constraint assigned with a highest priority on the priority list. The proposal may be sent to one or more entities assigned to a constraint with a lowest priority. In response to receiving approvals of the proposal from all entities assigned to the constraint with the lowest priority, sending the proposal may be continued to one or more entities assigned to a constraint with a next higher priority. The sending of the proposal may be continued until approvals of the proposal are received from all entities assigned to a constraint with a second highest priority. In response to receiving approvals of the proposal from all entities assigned to the constraint with the second highest priority, the detected conflict may be resolved using the proposal.

In operation 410, an adjusted execution requirement for controlling the one or more trusted execution environments can be generated using the constraints of the adjusted constraint space. The adjusted execution requirement can define adjusted parameters for the execution of the workload in compliance with the constraints of the adjusted constraint space. The generating can include adding identifiers of the constraints to the adjusted execution requirement for an attestation of the constraints being complied with by the one or more trusted execution environments when executing the workload in compliance with the adjusted execution requirement. In operation 412, the one or more trusted execution environments can be controlled in compliance with the adjusted execution requirement. The controlling can include providing the one or more trusted execution environments with the adjusted execution requirement as a replacement for the execution requirement.

Figure 5:
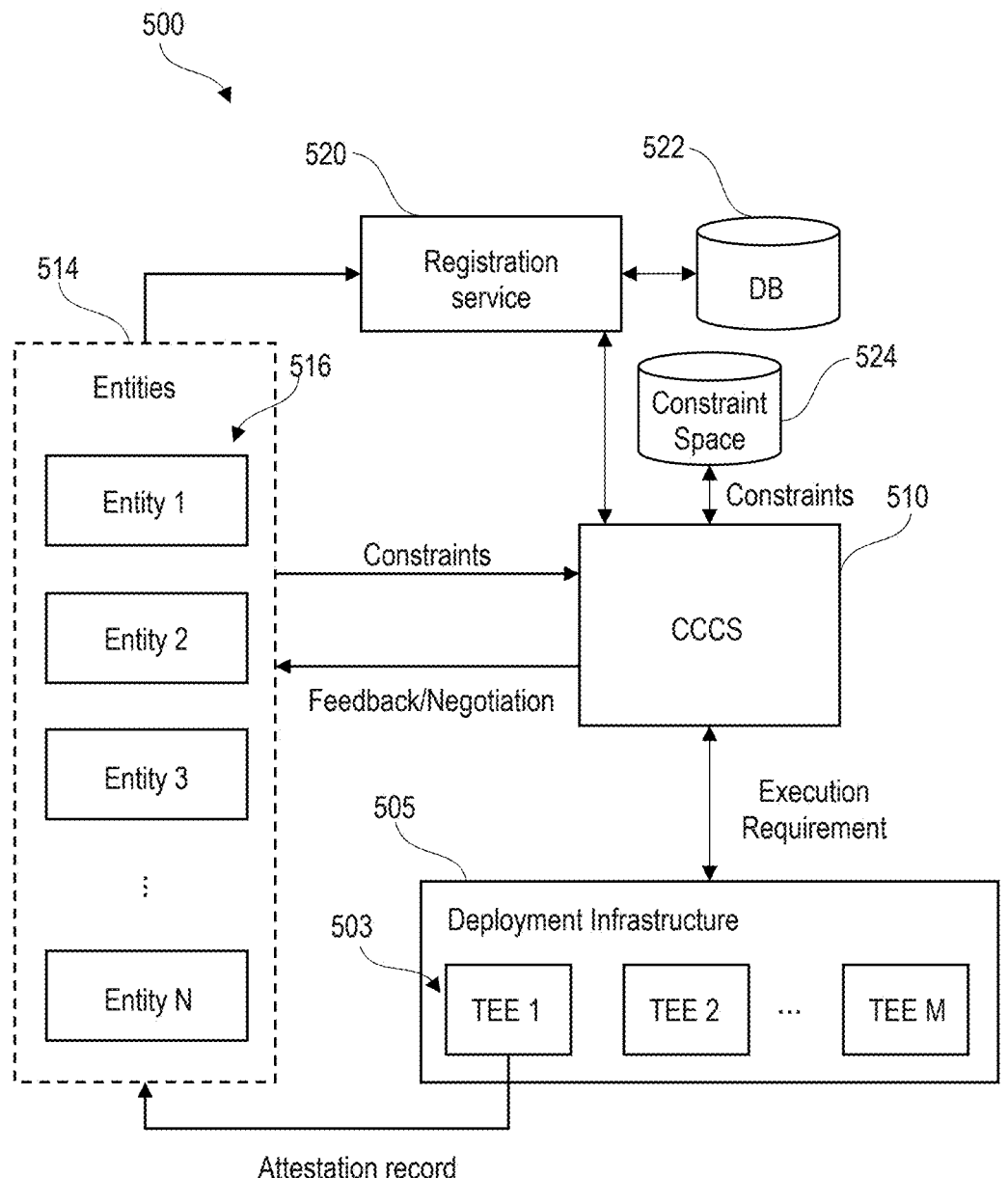
FIG. 5 is a block diagram illustrating a computing environment for controlling an execution of a workload on a trusted execution environment of a deployment infrastructure, according to some embodiments.

FIG. 5 is a block diagram illustrating a computing environment 500 for controlling an execution of a workload on one or more trusted execution environments (TEEs) 503 of a deployment infrastructure 505, according to some embodiments. The computing environment 500 can include a confidential computing control service (CCCS) 510. The CCCS 510 can be provided on a server, which may be in the form of a cloud service (e.g., Software as a Service (Saas)). The CCCS 510 can implement a method for automatically controlling an execution of a workload on one or more TEEs of the TEEs (TEE 1-TEE M) 503 provided by the deployment infrastructure 505 while compliance with a plurality of constraints required by a plurality of entities 514 is enforced. The plurality of constraints for the execution of the workload can be received by the CCCS 510 from the plurality of entities 514. Each of the entities 516 (Entity 1-Entity N) of the plurality of entities 514 may send one or more constraints to the CCCS 510 to be complied with by the TEEs 503 when executing the workload. The entities 516 may define their constraints sent to the CCCS 510 independently of one another. In some embodiments, the individual entities 516 may have no knowledge of the constraints defined by the other entities 516 of the plurality of entities 514. The entities 516 may be different entities that are each related to the workload to be executed using confidential computing. The plurality of entities 514 may include, e.g., one or more entities 516 such as developers, cloud infrastructure administrators, and/or administrators of one or more services used for developing, managing, and/or deploying the workload to be executed using the confidential computing provided by the CCCS 510 and the TEEs 503. The one or more services may include, for example, Kubernetes (K8s).

K8s is an open-source container orchestration system for automating software deployment, scaling, and management. K8s is configured to assemble one or more computers, either virtual or physical machines, into a cluster that is enabled to run workloads in containers. K8s may work with various container runtimes and is configured for running and managing workloads of different sizes and styles. K8s defines a set of building blocks, so called "primitives", that collectively provide mechanisms that are configured to deploy, maintain, and/or scale applications based on CPU, memory, and/or custom metrics. The plurality of entities 514 may include, e.g., one or more entities 516 of consumers. The plurality of entities 514 may include, e.g., one or more entities 516 of third-party representatives.

The entities 516 providing constraints to be taken into account, in combination, for generating a common execution requirement may be registered using, for example, a registration service 520. The registration service 520 may manage a database (DB) 522 with registration data of registered entities 516. In some embodiments, activity of the registered entities 516 may be logged using log data.

The constraints received by the CCCS 510 from the entities 516 can form a constraint space 524, which may be stored in a database to which the CCCS 510 has access. The CCCS 510 may be configured to detect conflicts between the constraints received. The CCCS 510 may be configured to resolve detected conflicts between constraints. The resolving of conflicts between constraints provided by the entities 516 may include, e.g., negotiating one or more adjustments of the constraints with the entities 516. The CCCS 510 may be configured to provide feedback about constraints that are being used for generating the execution requirement to the entities 516 from which those constraints are received. The CCCS 510 may further be configured to monitor the constraint space of the database 524 and update the constraint space 524 in response to receiving updates for constraints from the entities 516.

The CCCS 510 can be configured to automatically generate an execution requirement for controlling one or more TEEs 503 of the deployment infrastructure 505 using the constraints of the constraint space 524. The execution requirement can define parameters for the execution of the workload in compliance with the respective constraints. The generating may include adding identifiers of the constraints, such as checksums, to the execution requirement for an attestation of the constraints with which the one or more TEEs 503 comply when the workload is executed in compliance with the execution requirement. The execution requirement may be provided to a deployment pipeline of the deployment infrastructure 505 and used to control one or more of the TEEs 503 of the deployment infrastructure 505 in compliance with the execution requirement. The controlling may include providing the one or more TEEs 503 with the execution requirement. Providing the TEEs 503 with the execution requirement may, among other things, enable the TEEs 503 to provide one or more attestation records for the attestation of the execution of the workload to the entities 516. The attestation records can include the identifiers of the constraints. Using the identifiers from the attestation records, the entities 516 can be enabled to verify whether their constraints provided to CCCS 510 are actually used by the TEEs 503 for the execution of the workload. The identifiers may be provided in form of checksums, e.g., hash values, of the constraints. Thus, each of the entities 516 may be enabled to verify that their own constraints are complied with by calculating the checksums of their own constraints for the purpose of comparison with the attestation record. Additionally, each of the entities 516 may be prevented from gaining insights into the constraints defined by the other entities 516 when one-way functions, such as hash functions, are used to determine the identifiers of the constraints.

The entities 516 of, e.g., one or more developers of one or more cloud infrastructure providers, one or more service providers, such as Kubernetes administrators, one or more third-party representatives, and/or one or more consumers may register with the registration service 520 to use a cloud service. The registration service 520 may register the entities 516 and create a database entry in database 522 for each entity 516 and/or a persona represented by the entity 516.

Each entity 516 may generate a set of one or more constraints to be complied with by the TEEs 503 when executing a workload related to the entity 516. The set of constraints may include, e.g., constraints on a set of aspects defining one or more applications to be made operable in one or more TEEs 503. In some embodiments, the set of constraints may also include one or more constraints relating to other constraints.

The CCCS 510 may generate an execution requirement for controlling a set of one or more TEEs 503 according to the constraints received from the entities 516. Each entity 516 may encrypt its constraints that are being made available by, e.g., sending the constraints to the CCCS 510 using a public key of the CCCS 510 and/or a symmetric key agreed upon with the CCCS 510. The constraints corresponding to the entities 516 may be made available to the CCCS 510 in various ways. For example, the constraints may be sent to the CCCS 510 by the entities 516 or retrieved by the CCCS 510 using, e.g., a registration-based or crawler-like auto-discovery.

The CCCS 510 can use the constraints to build the constraint space 524 stored in a database. Building the constraint space 524 may comprise determining and/or receiving constraints represented in a constraint language and generated by the different entities 516. For example, the constraints may be received by the CCCS 510 via an API. In some embodiments, the CCCS 510 may perform a test for conflicts against the current constraint space 524 before accepting an additional constraint. For example, a test evaluation of the constraints may be performed.

The constraints from the constraint space may, e.g., be evaluated and resolved by the CCCS 510 into a consistent execution requirement for use by at least one TEE 503 while detecting potential conflicts between the constraints. Conflicts between constraints in the constraint space that are detected during constraint resolution may be flagged. Optionally, an additional conflict resolution protocol (CRP) may be executed by the CCCS 510 in order to resolve the flagged conflicts.

For each constraint of the constraint space, a measurement in the form of an identifier (e.g., a hash value, such as a sha256 checksum) of a canonical representation of the constraint (e.g., in a human-readable data serialization language, such as YAML) may be generated. These identifiers may be added to the execution requirement generated by the CCCS 510.

In addition, the CCCS 510 may generate and/or derive at least one secret in some embodiments. For example, an associated secret may be determined for each of the entities 516. The resulting one or more secrets may additionally be added to the execution requirement generated by the CCCS 510.

Additionally, the CCCS 510 may generate and provide feedback about the resolution and/or the resolution results to the entities 516. The feedback may include, e.g., feedback about the resulting execution requirement and/or feedback about which TEE 503 implements the execution requirement resulting from the constraints of the respective entities 516.

The CCCS 510 can provide the resulting execution requirements, e.g., via a deployment pipeline, to at least one TEE 503 for use. In some embodiments, a verifiable reference to the CCCS 510, such as a digital signature by the CCCS 510, may be provided as well.

The TEE 503 receiving the execution requirement may be facilitated to provide attestation records that include identifiers of the constraints complied with by the TEE 503 when executing the workload according to execution requirement. This may allow the entities 516 to validate the attestation records for their constraints by checking the identifiers. Further, when the one or more secrets are included, the execution requirement may enable the TEE 503 to encrypt and decrypt data in the TEE 503 when executing the workload according to the execution requirement.

In some embodiments, the CCCS 510 may be configured to monitor the constraint space 524 and determine constraint changes or additional constraints being added. Such adjustments to the constraint space 524 may, e.g., result from updated and/or additional constraints generated by one or more of the entities 516 and may be sent to the CCCS 510 via an API. In some embodiments, the updated and/or additional constraints are automatically generated by one or more of the entities 516. The updated and/or additional constraints may, e.g., define measurements to eliminate newly discovered vulnerabilities, replace time-bound constraints in which a duration of the time-bound constraints has elapsed, and/or take into account a change in geopolitical state.

Upon detecting a change in the constraint space 524, the CCCS 510 may, e.g., re-run and/or simulate an evaluation and resolution on basis of the updated constraint space. The execution requirement may be updated and/or regenerated using the updated constraint space. Information about the updated execution requirement and/or conflicts may be provided by the CCCS 510 to the TEEs 503. The TEEs 503 may in turn stop running previously deployed workloads that were based on the previously generated execution requirement. In some embodiments, detected conflicts may be flagged. In response to flagged conflicts, TEEs 503 that are using a previously created execution requirement may be automatically and/or actively undeployed. The flagged conflicts may be resolved by the CCCS 510, and the updated execution requirement may be generated using the updated constraint space for which the conflicts have been resolved. The resulting updated execution requirement may be provided to the TEEs 503 for deployment.

Figure 6:
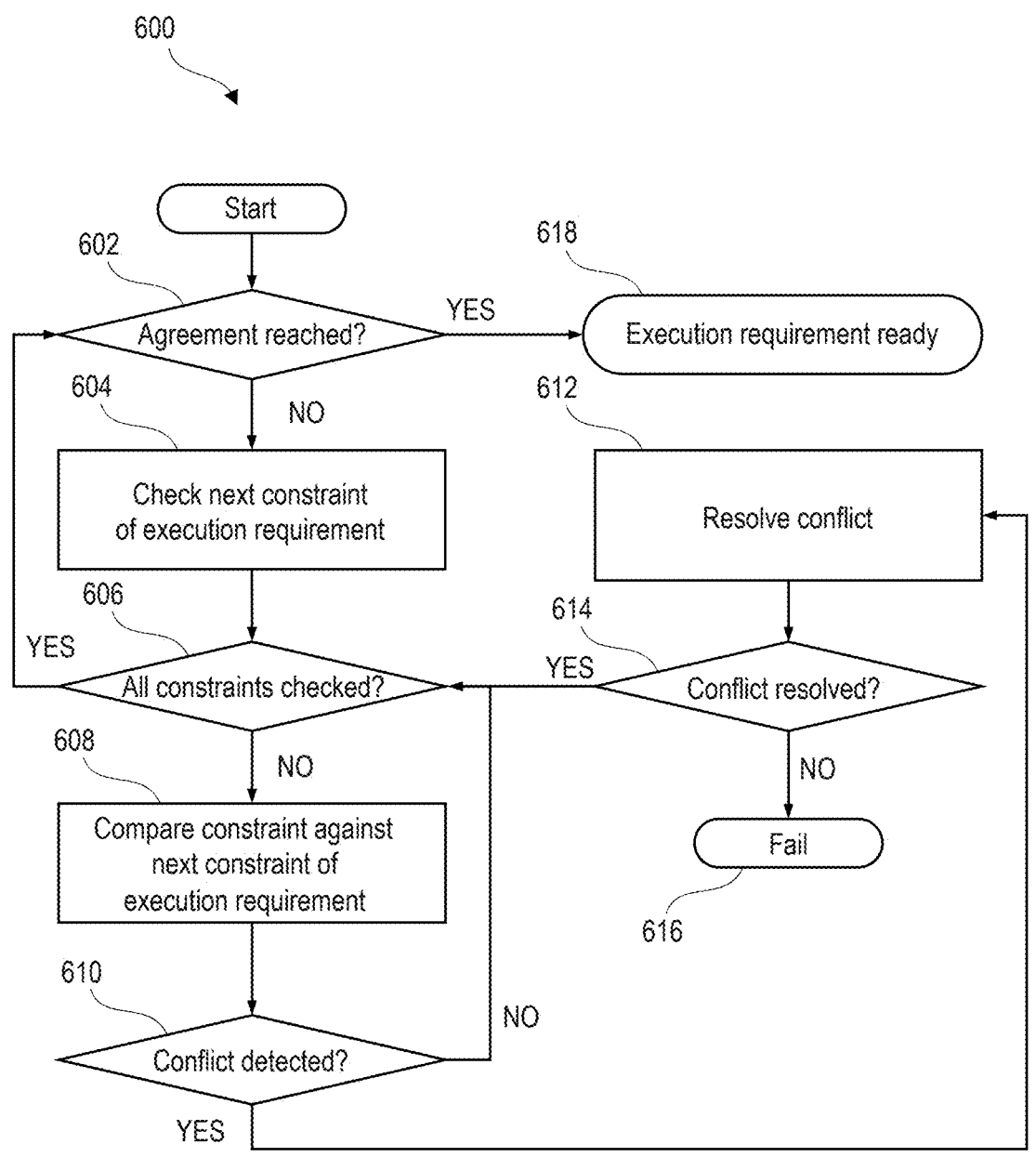
FIG. 6 is a flowchart illustrating a method for checking a preliminary execution requirement, according to some embodiments.

FIG. 6 is a flowchart illustrating a method 600 for checking a preliminary execution requirement, according to some embodiments. The preliminary execution requirement can be generated using a plurality of constraints received from a plurality of entities. The execution requirement can define parameters for the execution of the workload in compliance with the received constraints. In operation 602, it can be determined whether an agreement regarding the content of the execution requirement has been reached. In some embodiments, an agreement has been reached when the constraints included in the preliminary execution requirement are conflict-free. In response to an agreement having been reached, method 600 can proceed to operation 618. In operation 618, the execution requirement can be approved as being ready for use, i.e., for controlling one or more trusted execution environments.

In response to determining in operation 602 that no agreement has been reached yet, the constraints from the preliminary execution requirement may successively be checked and, when conflicts between constraints are detected, actions may be taken to resolve these conflicts. In operation 604, a next constraint of the execution requirement can be obtained and checked for conflicts. In operation 606, it can be determined whether the constraint from operation 604 has been compared with all of the other constraints of the preliminary execution requirement in order to check for conflicts. In response to determining at operation 606 that the constraint has been compared to all constraints of the preliminary execution requirement, method 600 can return to operation 602. In response to determining in operation 606 that the constraint has not been compared to all constraints of the preliminary execution requirement, method 600 can proceed to operation 608. In operation 608, the constraint from operation 604 can be compared against a next constraint of the other constraints of the preliminary execution requirement. In operation 610, it can be determined whether there is a conflict between the constraint from operation 604 and the constraint to which it was compared in operation 608. In response to determining in operation 610 that there is no conflict, method 600 can return to operation 606. In response to determining in operation 610 that there is a conflict, method 600 can proceed to operation 612.

In operation 612, actions can be taken to resolve the conflict detected in operation 610 based on the comparing in operation 608. In some embodiments, method 300 of FIG. 3 or method 700 of FIG. 7 can be used to resolve the conflict in operation 612. Method 700 is discussed in greater detail below with respect to FIG. 7. In operation 614, it can be determined whether the conflict detected in block 610 has been resolved successfully in operation 612. In response to determining in operation 614 that the conflict has not been resolved successfully, the check of the preliminary execution requirement fails (616). In response to the failure, the preliminary execution requirement checked in method 600 may be excluded from being used for controlling the one or more trusted execution environments. In response to determining at operation 614 that the conflict has been resolved successfully, method 600 can return to operation 606.

Figure 7:
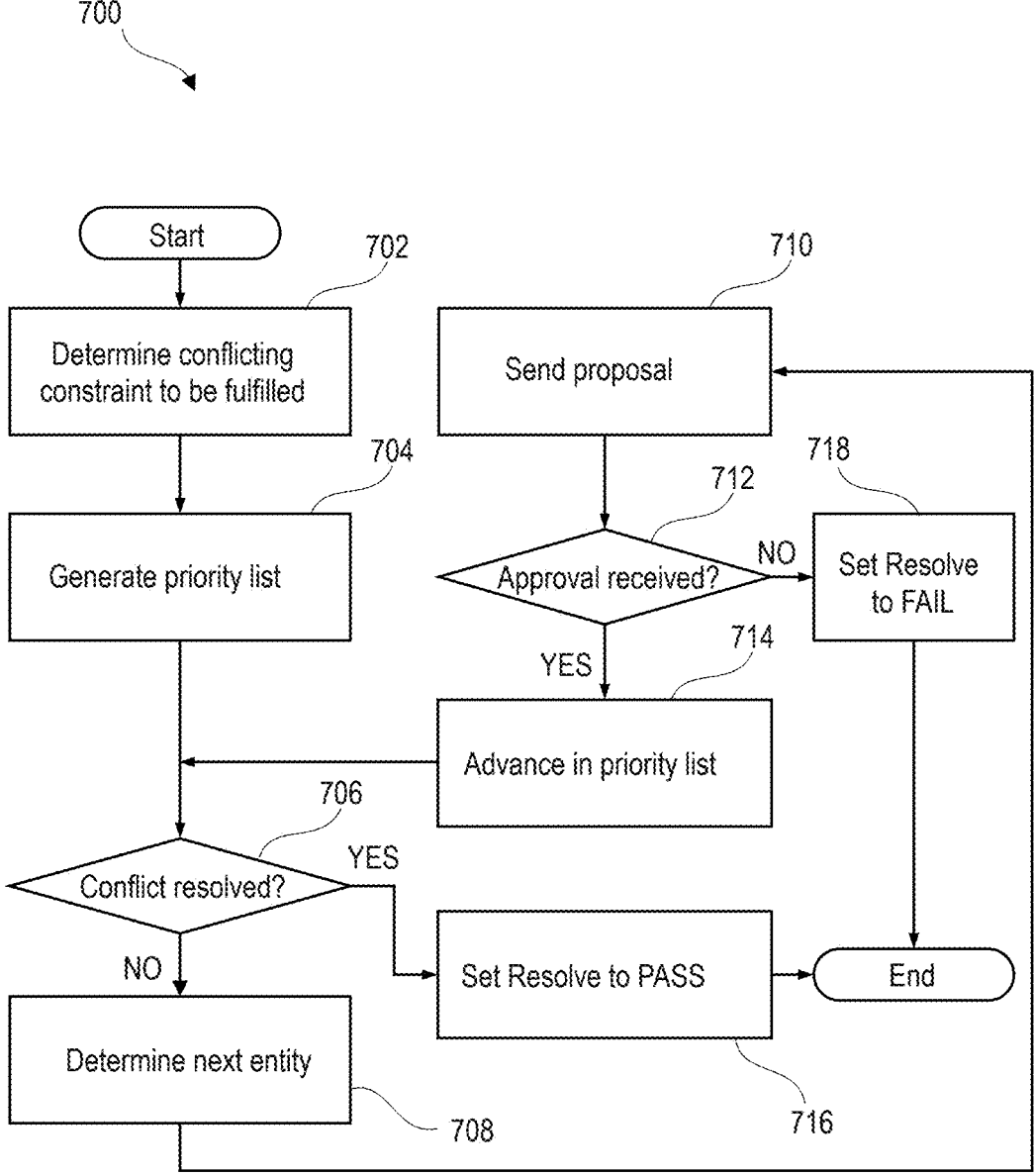
FIG. 7 is a flowchart illustrating a method for resolving conflicts between constraints, according to some embodiments.

FIG. 7 is a flowchart illustrating a method 700 for resolving conflicts between constraints, according to some embodiments. In operation 702, conflicting constraints to be fulfilled are determined. In operation 704, a priority list of the conflicting constraints determined in operation 702 can be generated. The priority list can assign priorities to each of the conflicting constraints. In some embodiments, the priorities assigned to the constraints are determined using one or more of the following: levels of security determined for the constraints, levels of restriction determined for the constraints, and numbers of entities assigned to the respective constraints.

In operation 706, it can be checked whether a conflict has been resolved for a first constraint determined in operation 702. In response to determining that the conflict has been resolved, the resolve attempt for the conflict can be set to "pass" in operation 716. Method 700 can then end with the conflict having been successfully resolved. However, in response to determining in operation 706 that the conflict has not been resolved, method 700 can proceed to operation 708. In operation 708, one or more next entities can be determined. The next entities can be those assigned to a constraint of the constraints from operation 702 having a next higher priority (according to the priority list generated in block 704).

In operation 710, a proposal for resolving the conflict can be sent to the one or more entities determined in operation 708. The proposal may be generated using a constraint of the constraints determined in block 702 assigned with a highest priority. For example, the constraint assigned with the highest priority may be used as the proposal. In operation 712, it is determined whether an approval is received in response to the proposal sent in operation 710. In response to determining that no approval has been received from the one or more entities, a resolving attempt can be set to "fail" in operation 718. Method 700 can then end with the conflict not having been resolved.

However, in response to determining in operation 712 that an approval has been received from the one or more entities, method 700 can proceed to operation 714. In operation 714, the priority (according to the priority list from operation 704) indicating which entities are to be provided with the proposal is advanced to the next higher priority, and method 700 can return to operation 706.

Figure 8:
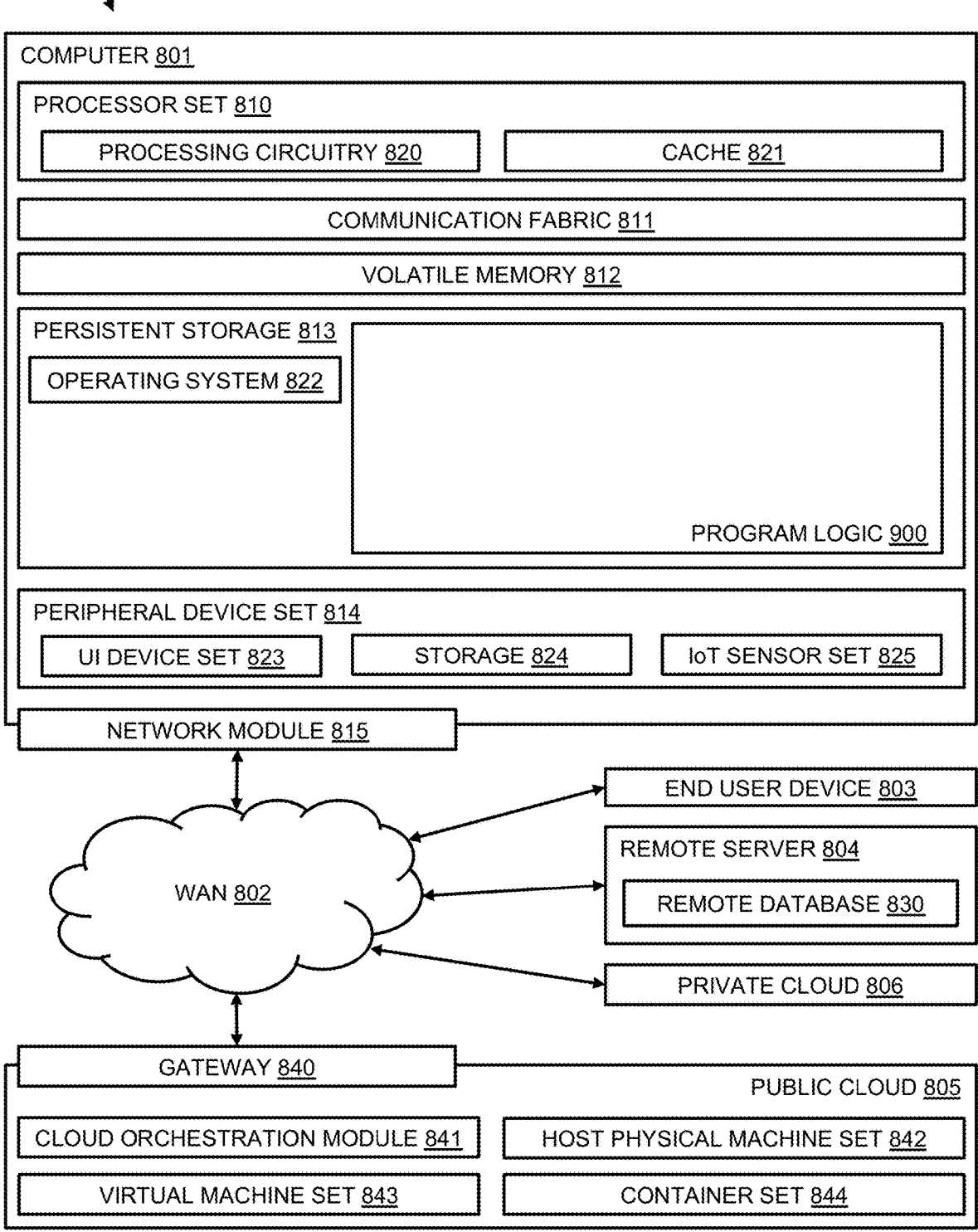
FIG. 8 is a block diagram illustrating a computing environment, according to some embodiments.

FIG. 8 is a block diagram illustrating a computing environment 800, according to some embodiments. Computing environment 800 contains an example of program logic 900 for the execution of at least some of the computer code involved in performing the inventive methods, such as automatically controlling an execution of a workload on one or more trusted execution environments while enforcing compliance with a plurality of constraints required by a plurality of entities.

In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid-state storage devices. Operating system 822 may take several forms, such as various known proprietary operating systems or open-source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer, and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Possible combination of features of examples described above may be the following:

Feature combination 1. A computer-implemented method comprising: receiving constraints for execution of a workload on one or more trusted execution environments from a plurality of entities, the constraints forming a constraint space; automatically generating an execution requirement for controlling the one or more trusted execution environments using the constraints of the constraint space, the execution requirement defining parameters for the execution of the workload in compliance with the constraints, wherein the automatically generating comprises adding identifiers of the constraints to the execution requirement for an attestation of constraints being complied with by the one or more trusted execution environments when executing the workload in compliance with the execution requirement; and controlling the one or more trusted execution environments in compliance with the execution requirement, wherein the controlling comprises providing the execution requirement to the one or more trusted execution environments, and wherein the providing enables the one or more trusted execution environments to provide one or more attestation records for an attestation of the execution of the workload, the attestation records comprising the identifiers of the constraints.

Feature combination 2. The method of feature combination 1, wherein the attestation records enable the entities to determine the identifiers of the constraints of the constraint space.

Feature combination 3. The method of feature combination 2, wherein the identifiers are checksums of the constraints, and wherein the determining of the identifiers comprises calculating the checksums.

Feature combination 4. The method of any of the preceding feature combinations, wherein the constraints of the constraint space define parameters for the execution of the workload on the one or more trusted execution environments.

Feature combination 5. The method of any of the preceding feature combinations, further comprising: checking the constraints for conflicts; and in response to detecting one or more conflicts, flagging the detected conflicts.

Feature combination 6. The method of feature combination 5, further comprising resolving the detected conflicts.

Feature combination 7. The method of feature combination 6, wherein the resolving of a detected conflict from the detected conflicts comprises: generating a priority list of conflicting constraints, wherein the conflicting constraints are constraints of the constraint space between which the detected conflict is detected, the priority list assigning priorities to the conflicting constraints; generating a proposal for resolving the detected conflict using a constraint assigned with a highest priority; sending the proposal to each entity assigned to a constraint with a lowest priority; in response to receiving approvals of the proposal from the each entity assigned to the constraint with the lowest priority, sending the proposal to each entity assigned to a constraint with a next higher priority; and in response to receiving approvals of the proposal from the each entity assigned to the constraint with the next higher priority, and in response to determining that the next higher priority is a second highest priority, resolving the detected conflict using the proposal.

Feature combination 8. The method of feature combination 7, wherein the priorities are determined using one or more of the following: levels of security determined for the respective constraints, levels of restriction determined for the respective constraints, and numbers of entities assigned to the respective constraints.

Feature combination 9. The method of any of the preceding feature combinations, further comprising monitoring the constraint space.

Feature combination 10. The method of feature combination 9, further comprising receiving one or more adjustments of the constraint space from one or more of the entities.

Feature combination 11. The method of any of the feature combinations 9 and 10, wherein the monitoring of the constraint space comprises: checking constraints of the adjusted constraint space for conflicts resulting from the received adjustments; and in response to detecting one or more conflicts, flagging the detected conflicts.

Feature combination 12. The method of feature combination 11, further comprising sending information about the flagged conflicts of the adjusted constraint space with instructions to abort execution of the workload to the one or more trusted execution environments.

Feature combination 13. The method of any of the feature combinations 11 and 12, the method further comprising resolving the detected conflicts of the adjusted constraint space.

Feature combination 14. The method of feature combination 13, wherein the resolving of a detected conflict of the adjusted constraint space comprises: generating a priority list of conflicting constraints, wherein the conflicting constraints are constraints of the adjusted constraint space between which the detected conflict is detected, the priority list assigning priorities to the conflicting constraints; generating a proposal for resolving the detected conflict using a constraint assigned with a highest priority; sending the proposal to each entity assigned to a constraint with a lowest priority; in response to receiving approvals of the proposal from the each entity assigned to the constraint with the lowest priority, sending the proposal to each entity assigned to a constraint with a next higher priority; and in response to receiving approvals of the proposal from the each entity assigned to the constraint with the next higher priority, and in response to determining that the next higher priority is a second highest priority, resolving the detected conflict using the proposal.

Feature combination 15. The method of any of the feature combinations 10 to 14, further comprising, in response to the receiving the one or more adjustments: generating an adjusted execution requirement for controlling the one or more trusted execution environments using the constraints of the adjusted constraint space, the adjusted execution requirement defining adjusted parameters for the execution of the workload in compliance with the constraints of the adjusted constraint space, the generating comprising adding identifiers of the constraints of the adjusted constraint space to the adjusted execution requirement for an attestation of the constraints of the adjusted constraint space being complied with by the one or more trusted execution environments when executing the workload in compliance with the adjusted execution requirement; and controlling the one or more trusted execution environments in compliance with the adjusted execution requirement, wherein the controlling comprises providing the one or more trusted execution environments with the adjusted execution requirement as a replacement for the execution requirement.

Feature combination 16. The method of any of the feature combinations 10 to 15, wherein the adjustments comprise one or more of the following: a revocation of a constraint, an adjusted constraint, and an additional constraint.

Feature combination 17. The method of any of the preceding feature combinations, wherein the generating the execution requirement further comprises adding, to the execution requirement, at least one secret to be used for encrypting and decrypting data of the execution of the workload on the one or more trusted execution environments.

Feature combination 18. The method of any of the preceding feature combinations, wherein the generating the execution requirement further comprises adding, to the execution requirement, at least one secret to be used in combination for encrypting and decrypting data of the execution of the workload on the one or more trusted execution environments.

Feature combination 19. A computer program product, the computer program product comprising a computer readable storage medium having program instructions embodied therewith, the program instructions executable by a processor to cause a device to perform a method, the method comprising: receiving constraints for execution of a workload on one or more trusted execution environments from a plurality of entities, the constraints forming a constraint space; automatically generating an execution requirement for controlling the one or more trusted execution environments using the constraints of the constraint space, the execution requirement defining parameters for the execution of the workload in compliance with the constraints, wherein the automatically generating comprises adding identifiers of the constraints to the execution requirement for an attestation of constraints being complied with by the one or more trusted execution environments when executing the workload in compliance with the execution requirement; and controlling the one or more trusted execution environments in compliance with the execution requirement, wherein the controlling comprises providing the execution requirement to the one or more trusted execution environments, and wherein the providing enables the one or more trusted execution environments to provide one or more attestation records for an attestation of the execution of the workload, the attestation records comprising the identifiers of the constraints.

Feature combination 20. A system comprising a memory; and a processor communicatively coupled to the memory, wherein the processor is configured to perform a method comprising: receiving constraints for execution of a workload on one or more trusted execution environments from a plurality of entities, the constraints forming a constraint space; automatically generating an execution requirement for controlling the one or more trusted execution environments using the constraints of the constraint space, the execution requirement defining parameters for the execution of the workload in compliance with the constraints, wherein the automatically generating comprises adding identifiers of the constraints to the execution requirement for an attestation of constraints being complied with by the one or more trusted execution environments when executing the workload in compliance with the execution requirement; and controlling the one or more trusted execution environments in compliance with the execution requirement, wherein the controlling comprises providing the execution requirement to the one or more trusted execution environments, and wherein the providing enables the one or more trusted execution environments to provide one or more attestation records for an attestation of the execution of the workload, the attestation records comprising the identifiers of the constraints.

The invention claimed is:

1. A computer-implemented method comprising:

receiving constraints for execution of a workload on one or more trusted execution environments from a plurality of entities, the constraints forming a constraint space;

automatically generating an execution requirement for controlling the one or more trusted execution environments using the constraints of the constraint space, the execution requirement defining parameters for the execution of the workload in compliance with the constraints, wherein the automatically generating comprises adding identifiers of the constraints to the execution requirement for an attestation of constraints being complied with by the one or more trusted execution environments when executing the workload in compliance with the execution requirement;

controlling the one or more trusted execution environments in compliance with the execution requirement, wherein the controlling comprises providing the execution requirement to the one or more trusted execution environments, and wherein the providing enables the one or more trusted execution environments to provide one or more attestation records for an attestation of the execution of the workload, the attestation records comprising the identifiers of the constraints;

receiving one or more adjustments of the constraint space from one or more of the entities; and monitoring the constraint space, wherein the monitoring comprises:

checking constraints of the adjusted constraint space for conflicts resulting from the received adjustments; and in response to detecting one or more conflicts in the constraints of the adjusted constraint space, flagging the detected conflicts of the adjusted constraint space.

2. The method of claim 1, wherein the attestation records enable the entities to determine the identifiers of the constraints of the constraint space.

3. The method of claim 2, wherein the identifiers are checksums of the constraints, and wherein the determining of the identifiers comprises calculating the checksums.

4. The method of claim 1, wherein the constraints of the constraint space define parameters for the execution of the workload on the one or more trusted execution environments.

5. The method of claim 1, further comprising:

checking the constraints of the constraint space for conflicts; and in response to detecting one or more conflicts in the constraints of the constraint space, flagging the detected conflicts of the constraint space.

6. The method of claim 5, further comprising resolving the detected conflicts of the constraint space.

7. The method of claim 6, wherein the resolving of a detected conflict from the detected conflicts of the constraint space comprises:

generating a priority list of conflicting constraints, wherein the conflicting constraints are constraints of the constraint space between which the detected conflict is detected, the priority list assigning priorities to the conflicting constraints;

generating a proposal for resolving the detected conflict using a constraint assigned with a highest priority;

sending the proposal to each entity assigned to a constraint with a lowest priority;

in response to receiving approvals of the proposal from the each entity assigned to the constraint with the lowest priority, sending the proposal to each entity assigned to a constraint with a next higher priority; and in response to receiving approvals of the proposal from the each entity assigned to the constraint with the next higher priority, and in response to determining that the next higher priority is a second highest priority, resolving the detected conflict using the proposal.

8. The method of claim 7, wherein the priorities are determined using one or more of the following: levels of security determined for the respective constraints, levels of restriction determined for the respective constraints, and numbers of entities assigned to the respective constraints.

9. The method of claim 1, further comprising sending information about the flagged conflicts of the adjusted constraint space with instructions to abort execution of the workload to the one or more trusted execution environments.

10. The method of claim 1, the method further comprising resolving the detected conflicts of the adjusted constraint space.

11. The method of claim 10, wherein the resolving of at least one of the detected conflicts of the adjusted constraint space comprises:

generating a priority list of conflicting constraints, wherein the conflicting constraints are constraints of the adjusted constraint space between which the detected conflict is detected, the priority list assigning priorities to the conflicting constraints;

generating a proposal for resolving the detected conflict using a constraint assigned with a highest priority;

sending the proposal to each entity assigned to a constraint with a lowest priority;

in response to receiving approvals of the proposal from the each entity assigned to the constraint with the lowest priority, sending the proposal to each entity assigned to a constraint with a next higher priority; and in response to receiving approvals of the proposal from the each entity assigned to the constraint with the next higher priority, and in response to determining that the next higher priority is a second highest priority, resolving the detected conflict using the proposal.

12. The method of claim 1, further comprising, in response to the receiving the one or more adjustments:

generating an adjusted execution requirement for controlling the one or more trusted execution environments using the constraints of the adjusted constraint space, the adjusted execution requirement defining adjusted parameters for the execution of the workload in compliance with the constraints of the adjusted constraint space, the generating comprising adding identifiers of the constraints of the adjusted constraint space to the adjusted execution requirement for an attestation of the constraints of the adjusted constraint space being complied with by the one or more trusted execution environments when executing the workload in compliance with the adjusted execution requirement; and controlling the one or more trusted execution environments in compliance with the adjusted execution requirement, wherein the controlling comprises providing the one or more trusted execution environments with the adjusted execution requirement as a replacement for the execution requirement.

13. The method of claim 1, wherein the adjustments comprise one or more of the following: a revocation of a constraint, an adjusted constraint, and an additional constraint.

14. The method of claim 1, wherein the generating the execution requirement further comprises adding, to the execution requirement, at least one secret to be used for encrypting and decrypting data of the execution of the workload on the one or more trusted execution environments.

15. The method of claim 1, wherein the generating the execution requirement further comprises adding, to the execution requirement, at least one secret to be used in combination for encrypting and decrypting data of the execution of the workload on the one or more trusted execution environments.

16. A computer program product, the computer program product comprising a computer readable storage medium having program instructions embodied therewith, the program instructions executable by a processor to cause a device to perform a method, the method comprising:

receiving constraints for execution of a workload on one or more trusted execution environments from a plurality of entities, the constraints forming a constraint space;

automatically generating an execution requirement for controlling the one or more trusted execution environments using the constraints of the constraint space, the execution requirement defining parameters for execution of the workload in compliance with the constraints, wherein the automatically generating comprises adding identifiers of the constraints to the execution requirement for an attestation of constraints being complied with by the one or more trusted execution environments when executing the workload in compliance with the execution requirement;

controlling the one or more trusted execution environments in compliance with the execution requirement, wherein the controlling comprises providing the execution requirement to the one or more trusted execution environments, and wherein the providing enables the one or more trusted execution environments to provide one or more attestation records for an attestation of the execution of the workload, the attestation records comprising the identifiers of the constraints;

receiving one or more adjustments of the constraint space from one or more of the entities; and monitoring the constraint space, wherein the monitoring comprises:

checking constraints of the adjusted constraint space for conflicts resulting from the received adjustments; and in response to detecting one or more conflicts, flagging the detected conflicts.

17. A system comprising:

a memory; and a processor communicatively coupled to the memory, wherein the processor is configured to perform a method comprising:

receiving constraints for execution of a workload on one or more trusted execution environments from a plurality of entities, the constraints forming a constraint space;

automatically generating an execution requirement for controlling the one or more trusted execution environments using the constraints of the constraint space, the execution requirement defining parameters for execution of the workload in compliance with the constraints, wherein the automatically generating comprises adding identifiers of the constraints to the execution requirement for an attestation of constraints being complied with by the one or more trusted execution environments when executing the workload in compliance with the execution requirement;

controlling the one or more trusted execution environments in compliance with the execution requirement, wherein the controlling comprises providing the execution requirement to the one or more trusted execution environments, and wherein the providing enables the one or more trusted execution environments to provide one or more attestation records for an attestation of the execution of the workload, the attestation records comprising the identifiers of the constraints;

receiving one or more adjustments of the constraint space from one or more of the entities; and monitoring the constraint space, wherein the monitoring comprises:

checking constraints of the adjusted constraint space for conflicts resulting from the received adjustments; and in response to detecting one or more conflicts, flagging the detected conflicts.

18. The system of claim 17, wherein the method further comprises sending information about the flagged conflicts of the adjusted constraint space with instructions to abort execution of the workload to the one or more trusted execution environments.

19. The system of claim 17, wherein the method further comprises resolving the detected conflicts of the adjusted constraint space, and wherein the resolving comprises:

generating a priority list of conflicting constraints, wherein the conflicting constraints are constraints of the adjusted constraint space between which the detected conflict is detected, the priority list assigning priorities to the conflicting constraints;

generating a proposal for resolving the detected conflict using a constraint assigned with a highest priority;

sending the proposal to each entity assigned to a constraint with a lowest priority;

in response to receiving approvals of the proposal from the each entity assigned to the constraint with the lowest priority, sending the proposal to each entity assigned to a constraint with a next higher priority; and in response to receiving approvals of the proposal from the each entity assigned to the constraint with the next higher priority, and in response to determining that the next higher priority is a second highest priority, resolving the detected conflict using the proposal.

20. The system of claim 17, wherein the method further comprises, in response to the receiving the one or more adjustments:

generating an adjusted execution requirement for controlling the one or more trusted execution environments using the constraints of the adjusted constraint space, the adjusted execution requirement defining adjusted parameters for the execution of the workload in compliance with the constraints of the adjusted constraint space, the generating comprising adding identifiers of the constraints of the adjusted constraint space to the adjusted execution requirement for an attestation of the constraints of the adjusted constraint space being complied with by the one or more trusted execution environments when executing the workload in compliance with the adjusted execution requirement; and controlling the one or more trusted execution environments in compliance with the adjusted execution requirement, wherein the controlling comprises providing the one or more trusted execution environments with the adjusted execution requirement as a replacement for the execution requirement.

\*   \*   \*   \*   \*